March 24, 1970    H. GEISEL ET AL    3,503,026

DISC-SHAPED TRANSFORMER

Filed May 4, 1967    2 Sheets-Sheet 1

Inventors
Herbert Geisel
Hermann Kuhlbars
By Cushman, Darby & Cushman
Attorneys

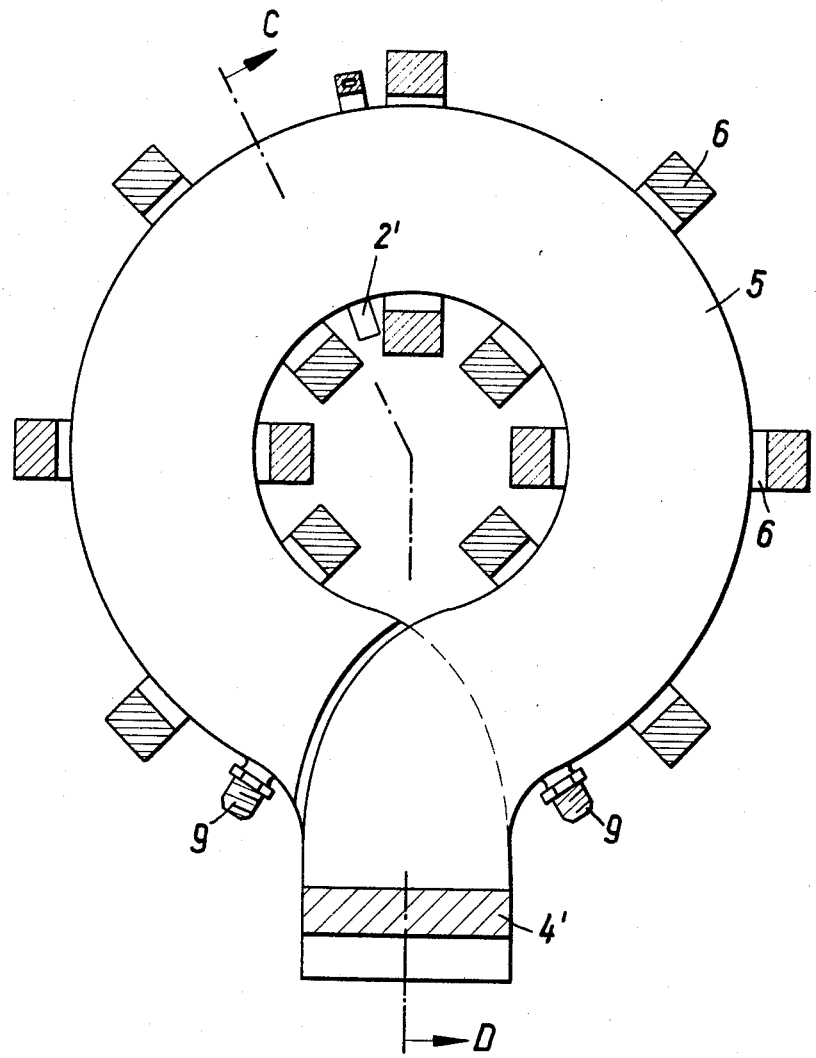

United States Patent Office 3,503,026
Patented Mar. 24, 1970

3,503,026
DISC-SHAPED TRANSFORMER
Herbert Geisel and Hermann Kuhlbars, Remscheid-Lut-tringhausen, Germany, assignors to AEG-Elotherm GmbH., Remscheid-Hasten, Germany
Filed May 4, 1967, Ser. No. 636,189
Claims priority, application Germany, May 7, 1966,
A 52,403
Int. Cl. H01f 27/08, 27/28
U.S. Cl. 336—62
2 Claims

ABSTRACT OF THE DISCLOSURE

A transformer constructed in the general shape of a disc suitable for use with inductors for inductively heating crankshafts, comprising spirally-wound primary coils axially juxtaposed with secondary coils, and frame-like ferrite cores for coupling the windings each embracing the said primary and secondary coils, and radially disposed round the coils in the form of a star.

---

Figure 1:
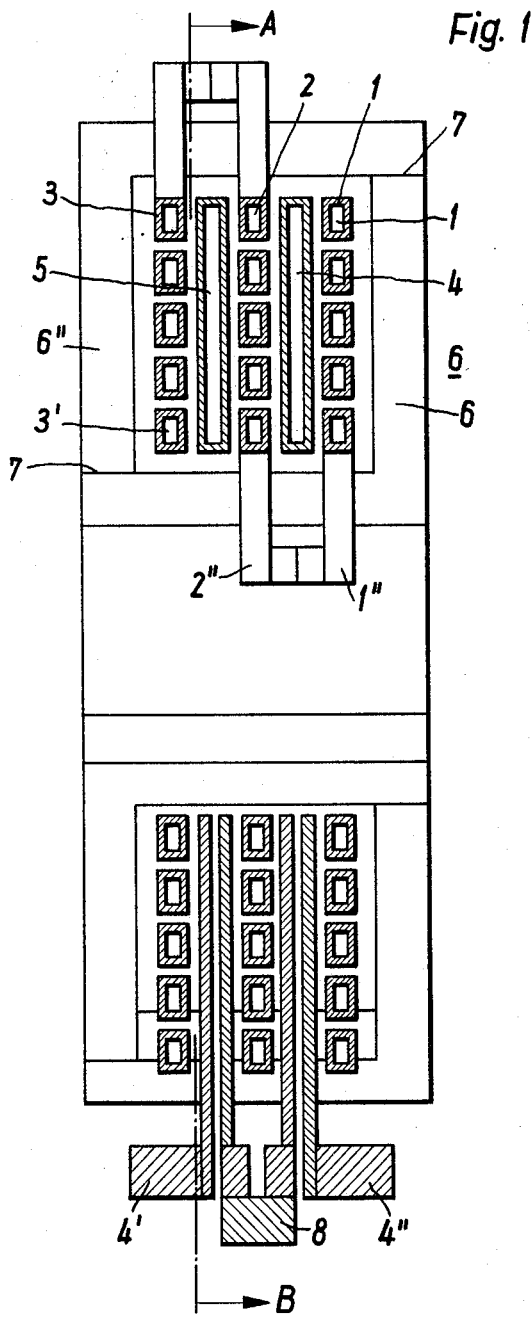

This invention relates to transformers which are in the shape of a disc.

It is known and often necessary to construct transformers that are as narrow as possible, for instance when they are required to operate alongside inductors for inductively heating crankshafts.

For such purposes the overall shape of the transformer should be substantially that of a disc. According to the invention, such a configuration is obtained by forming the transformer with spirally wound primary and secondary coils that are axially juxtaposed and which are embraced by frame-like ferrite cores for coupling the windings together, radially disposed in the form of a star.

Conveniently the arrangement may be such that the windings of the secondary coil are connected either in parallel or in series, or partly in parallel and some or all of the parallel windings in series. This creates a single turn coil or a coil comprising very few turns which can nevertheless be cooled throughout its extent since this secondary coil and the correspondingly wound primary coil may be formed from hollow copper tubing for conducting a liquid therethrough.

It is a particularly advantageous feature of the disc-type transformers of the invention that a plurality of primary and secondary coils can be assembled in alternation in axial juxtaposition for the purpose of meeting any particular set of working conditions.

A preferred embodiment of the invention is schematically shown in the accompanying drawings, of which FIGURE 1 is a transverse cross-section of the coil, and which is taken along the line C–D of FIGURE 2, and FIGURE 2 is a section taken on the line A–B of FIGURE 1.

Referring to the drawings, a transformer includes three spirally wound primary coils 1, 2 and 3. The current enters at 1'. The end 1" of this spiral coil is connected to the end 2" of the second spiral coil 2. The other end of the said second coil is connected to coil 3, and the end of the entire primary winding of the transformer is at 3'.

The primary coils alternate with disc-shaped hollow coils 4 and 5 which form the secondary winding. In the illustrated example both turns of the secondary coils are electrically connected to each other by bridge portion 8 in an axial direction, and have electrical terminals 4' and 4".

The transformer is thus in the general form of a disc, and in the embodiment illustrated, the turns of the primary and secondary coils are of hollow copper tubing so that a very efficient cooling system is thus provided for these discs 4. Inlet and outlet taps 9 are provided for the coolant liquid.

The coils of the transformer are embraced by frame-like ferrite cores 6. Each ferrite core consists of two L-shaped members 6' and 6" adhesively bonded together at their abutting corners at 7. As will be seen, more particularly by reference to FIGURE 2, these ferrite cores are placed radially over the windings. It will be readily understood that the result is a form of construction requiring little space in the axial direction and that it is readily possible to assemble fewer or more axially adjacent coils than in the embodiment shown in the drawings.

What is claimed is:
1. A transformer substantially in the shape of a disc with a primary winding comprising:
   a plurality of spirally-wound primary coils in a planar configuration;
   a secondary winding comprising one or more secondary coils;
   each primary coil being axially juxtaposed with a secondary coil while both the primary and secondary coils are comprised of hollow conductors to facilitate the flow of cooling fluid therethrough; and
   frame-like ferrite cores for coupling the windings each embracing the said primary and secondary coils, and radially disposed around the coils in the form of a star.

2. A transformer in the shape of a disc, comprising:
   a plurality of primary coils wherein each of said plurality is spirally wound in a planar configuration and wherein the plane defined by said primary coils is oriented perpendicularly to the avis of said transformer;
   a plurality of secondary coils axially juxtaposed with respect to said primary coils;
   frame-like ferrite cores for coupling the windings each embracing the said primary and secondary coils, and radially disposed around the coils in the form of a star;
   wherein said primary and secondary coils are comprised of hollow conductors to facilitate the flow of cooling fluid therethrough.

References Cited

UNITED STATES PATENTS 1,394,044  10/1921  Stephens _____ 336—62 XR

THOMAS J. KOZMA, Primary Examiner

U.S. Cl. X.R.

336—183, 232